United States Patent
Freimuth et al.

(10) Patent No.: US 7,472,159 B2
(45) Date of Patent: Dec. 30, 2008

(54) SYSTEM AND METHOD FOR ADAPTIVE ADMISSION CONTROL AND RESOURCE MANAGEMENT FOR SERVICE TIME GUARANTEES

(75) Inventors: Douglas Morgan Freimuth, New York, NY (US); Prashant Pradhan, New Rochelle, NY (US); Sambit Sahu, Mahopac, NY (US); Renu Tewari, San Jose, CA (US); Donna N. Dillenberger, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 10/439,791

(22) Filed: May 15, 2003

(65) Prior Publication Data
US 2004/0230675 A1 Nov. 18, 2004

(51) Int. Cl.
*G06F 15/16* (2006.01)
(52) U.S. Cl. ........................ 709/203; 709/217; 709/223; 709/224; 370/395.4

(58) Field of Classification Search .................. 709/203, 709/207, 217, 223, 224; 370/440, 395.4
See application file for complete search history.

(56) References Cited

U.S. PATENT DOCUMENTS

| | | | |
|---|---|---|---|
| 6,341,303 B1 * | 1/2002 | Rhee et al. ................... | 718/104 |
| 6,876,668 B1 * | 4/2005 | Chawla et al. .............. | 370/468 |
| 6,981,029 B1 * | 12/2005 | Menditto et al. ............ | 709/217 |
| 7,062,557 B1 * | 6/2006 | Bhatti et al. ................. | 709/226 |
| 2002/0161832 A1 | 10/2002 | Brebner | |
| 2003/0217111 A1 * | 11/2003 | McKay ....................... | 709/207 |
| 2003/0227926 A1 * | 12/2003 | Ramamurthy et al. .. | 370/395.42 |

\* cited by examiner

*Primary Examiner*—Salad Abdullahi
*Assistant Examiner*—El Hadji M Sall
(74) *Attorney, Agent, or Firm*—Anne Vachon Dougherty (57) ABSTRACT

A method and system architecture to manage system resources in such a way as to provide service time guarantees to various classes of work using the system. In the case that the system resources are not sufficient to provide the specified service time guarantees, a method and system architecture is provided to limit work into the system such that the guarantees are satisfied and the revenue derived from the system is maximized.

9 Claims, 4 Drawing Sheets

SYSTEM AND METHOD FOR ADAPTIVE ADMISSION CONTROL AND RESOURCE MANAGEMENT FOR SERVICE TIME GUARANTEES

FIELD OF THE INVENTION

The invention relates to generally to client-server architecture; and, more particularly, to adaptively controlling admission of requests to multiple server resources to provide delay guarantees for various classes of client requests.

BACKGROUND OF THE INVENTION

Numerous web-based applications offer e-commerce services that must be reliable and time-bound. Application service providers strive to offer the best quality of service to their customers. One metric for quality of service (commonly referred to as "QoS") from the client perspective is the time taken by the web server to service a request. For a server, however, providing a uniform delay guarantee for all customer requests is neither practical nor efficient. Clearly different requests will consume different amounts of server resources and will presumably require differing amount of time for completion. In addition, certain types of requests may be "time critical" while others are tolerant of longer delays. Accordingly, service providers offer different time or delay guarantees based on the QoS or service speed, with clients paying higher rates for faster service, often referred to as "gold service."

The offered service time differentiation needs to be based on various attributes of the request type, the identity of the requesting client, and the type or class of service to which the client subscribes (i.e., their level of account guarantees). Clearly, also, the load on the server factors into the delay incurred by a request, with the load being a function of the number of requests and the resource requirements of each request. In order to provide service time differentiation, the server has to control the multiple resources used, isolate the requests from other classes, and, control the number and type of incoming requests. Since incoming workload is not fixed, a simple static allocation of resources does not achieve the desired control.

It is, therefore, an objective of the present invention to provide a system and method for adaptive admission control of client requests in order to meet service time guarantees.

Yet another objective of the present invention is to provide dynamic partitioning of resources in order to meet service time guarantees.

SUMMARY OF THE INVENTION

The foregoing and other objectives of the invention are realized by the present invention which provides a method and system architecture to manage system resources in such a way as to provide service time guarantees to various classes of work using the system. When the system resources are not sufficient to provide the specified service time guarantees, the present method and system architecture act to limit work going into the system, such that the guarantees are satisfied while maximizing the revenue derived from the system.

In one embodiment, a server system, consisting of multiple tiers including a front-end tier of web servers, a middle tier of application servers, and a back-end tier of database servers, is representatively used for serving requests. At least two classes of requests are defined for the system with at least two different service time guarantees for their requests. The proposed method and system would allocate system resources such as CPU, disk capacity, and network capacity, to these classes of requests in such a way that the respective service guarantees will be met. If the system resources are not sufficient to meet the service time guarantees, the method will limit the requests of one or both classes in such a way that the revenue from these requests will be maximized.

BRIEF DESCRIPTION OF THE FIGURES

The invention will hereinafter be described in greater detail with specific reference to the drawings in which.

DETAILED DESCRIPTION OF THE INVENTION

Figure 1:
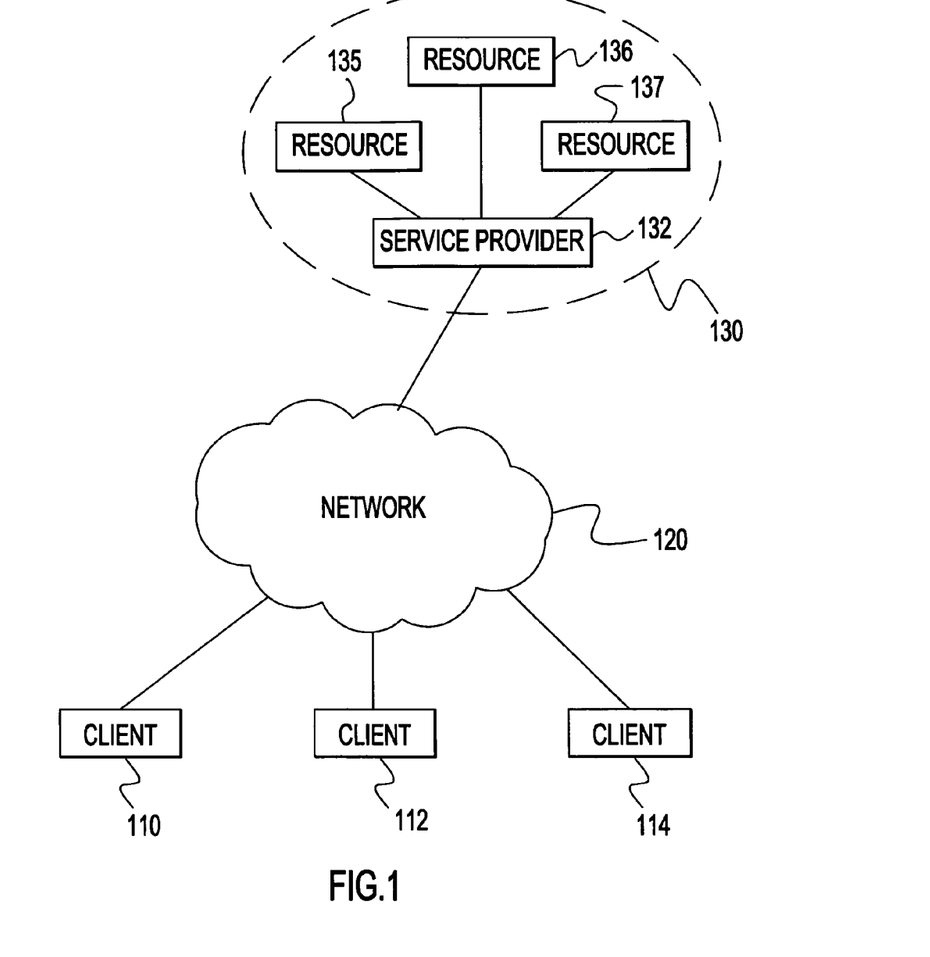
FIG. 1 provides a block diagram of a network environment in which to implement the present invention.

A representative client-server environment in which to implement the present invention is illustrated in FIG. 1. A client, shown at 110, issues a request to a service provider 132 at server location 130. The request may be delivered over network 120 or issued along a wired interconnection (not shown) if the client is directly linked to the server, for example in a local area network (LAN). The service provider 132 will generally have access to a plurality of server resources, shown as 135-137, for servicing client requests. Assuming that the server is additionally receiving requests from other clients, 112 and 114, the server will evaluate how to most effectively service the incoming requests while maximizing revenues based on explicit (i.e., by contract) or implicit service arrangements for the respective clients.

In the ensuing description of the invention, the following inputs to a server location are detailed:

1. The workload of each request class includes the request arrival pattern and the amount of work required by the request from each system resource. This input is measured by continuously monitoring the system.

2. The response time goals for each request class are specified in a policy.

3. The revenue derived from a request of each request class is specified in a policy.

4. The capacities of each system resource are known a priori from the hardware attributes of various resources such as the CPUs, disks, network links, etc.

Given these inputs, the inventive resource management method has two basic steps. First, a global allocation algorithm is applied to determine a local deadline for a request class in each resource used by the requests of that class. Then, a local adaptation algorithm is applied to determine the local resource allocation for each request class that would meet the local deadline for that request class in those resources. For example, assuming that two resources are available, namely the CPU and the network, and that there are two request classes with response time goals of 1 second and 2 seconds, then the global allocation algorithm may determine that class 1 requests would get a local deadline allocation of 0.5 sec in the CPU and 0.5 sec in the network, and that class 2 requests would get a local deadline allocation of 0.5 sec in the CPU and 1.5 sec in the network. Thereafter, the local adaptation algorithm would arrive at the optimal allocation of CPU and network resources to each class that would achieve these local deadlines. Continual monitoring of both the status of class requests and the workload at the resources is undertaken. Upon evaluation of the monitoring results, the system may further adjust the class shares to better utilize the resources to meet the QoS guarantees for the classes.

Figure 2:
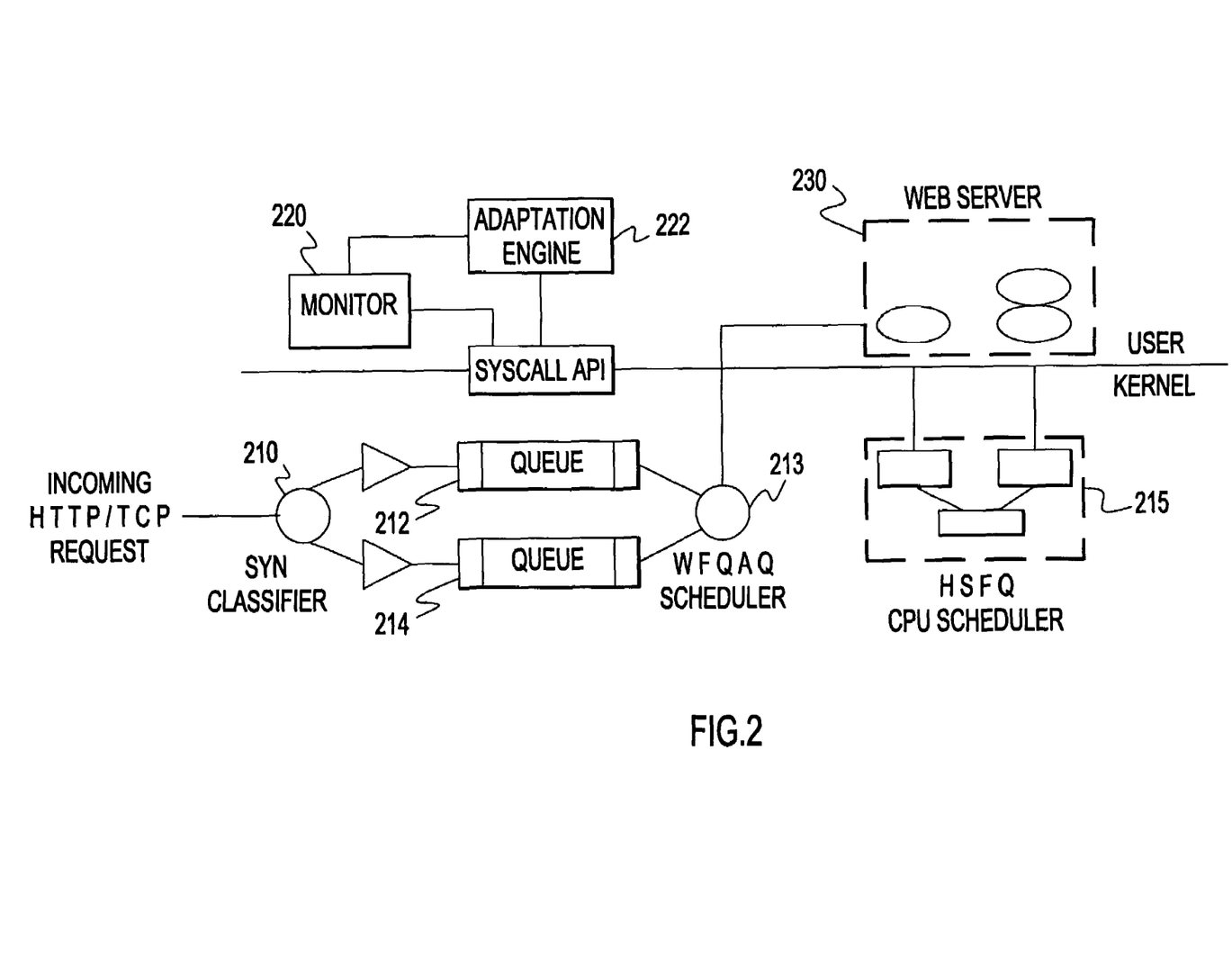
FIG. 2 illustrates a representative system architecture for implementing the present invention.

FIG. 2 illustrates a representative architecture for implementing the resource management system of the present invention. As will be apparent to one having skill in the relevant art, the illustrated components can be combined or modified, or their functionalities rendered in software, without affecting the logical architecture as shown. The resource management system comprises three functional components, including the resource control function, the monitoring framework, and the adaptation engine. The resource control function includes the components at which the requests are received, queued, and scheduled. As shown, the resource control function comprises a SYN classifier 210, at least two class-based accept queues, 212 and 214, a scheduler 213 for orchestrating the removal of requests from the class-based request queues for provision to the server 230, and CPU scheduler, 215 which is preferably a hierarchical start-time fair queuing scheduler, for scheduling server resources. The monitoring framework includes monitor 220, which evaluates the resource requirements of incoming requests and provides input to the adaptation engine 222. The adaptation engine 222, in turn, provides input to the accept queue scheduler, for adaptive admission control of incoming requests, and may optionally also provide input to the CPU scheduler, for resource management of server resources. Through the monitoring framework, the performance of each class is monitored continuously at monitor 220, as well as the workload of the respective resources. In response to changing workload, the adaptation engine 222 adjusts the shares assigned to each class in the accept queues and the CPU scheduler 215 such that the QoS goals are met. The details of the components are further described below.

In the resource control function, the kernel performs early de-multiplexing and classification of incoming packets and assigns each request to a service class at the SYN classifier 210. After a request is admitted and added to one of the class-based accept queues, 212 or 214, the weighted fair queuing accept queue (WFQAQ) scheduler 213 determines the order in which the waiting processes accept the requests. After accepting a new request, each process is attached to the corresponding CPU service class of the request and scheduled by the CPU scheduler.

The SYN classifier 210 uses the network packet headers to perform classification of incoming requests into different service classes. Since a majority of web requests use TCP as the underlying transport, the SYN classifier is shown as residing in the TCP/IP processing path. The classifier employs classification rules to determine the class to which an incoming connection belongs, and includes mechanisms for admission control via SYN policing, as detailed in "Kernel Mechanisms for Service Differentiation in Overloaded Web Servers" by T. Voight, et al, *Proceedings of the Usenix Annual Technical Conference* (June 2001). Table 1 provides an example of classification rules based on the network 4-tuple (IP address and port number).

TABLE 1

Classification Rules

| FILTER | QoS SPECIFICATION |
|---|---|
| 128.1.1.*, 80, *, * | Delay = 200 ms |
| 128.1.1.*, 21, *, * | Delay = 1 sec |
| *, *, 112.3.4.*, * | Thruput = 100 req/sec |

In a Linux implementation, the iptables command can be used to insert and delete rules in the kernel packet filtering tables, with the filters being maintained by the netfilter framework inside the Linux kernel.

For a new incoming request, after the three-way TCP handshake is complete, the connection is moved from the SYN classifier queue (not shown, which is called the "partial-listen queue" in a BSD-based stack) to the listening socket's accept queue. Instead of a single FIFO accept queue for all requests, the present architecture employs a separate accept queue for each service class, shown in FIG. 2 as 212 and 214. Requests in these queues are scheduled by the accept queue scheduler, 213, ideally implemented as a work-conserving weighted fair queuing (WFQAQ) scheduler. The accept queue scheduler 213 controls the order in which requests are accepted from these queues for service by the web server processes. The accept queue scheduler 213 allows a weight to be assigned to each class based on the preestablished policy, wherein the rate of requests accepted from a class is proportional to its weight. Thus, the weight setting for a class is used to control its delay in the accept queue. As soon as a process becomes idle, a request is dequeued from one of the class-specific accept queues, 212 or 214, in accordance with the weight assignments. Thus, the process pool is not statically partitioned across the classes, but is dynamically assigned.

It is to be noted here that alternative scheduling mechanisms, other than the weighted fair queuing approach, can be employed. For example a fixed static-priority accept queue, which always services a higher priority request before servicing a lower priority request, could be employed. Another approach would be to employ deadline-based scheduling of tasks (e.g., EDF). This approach assigns a deadline to each request and orders/schedules requests in increasing order of deadlines. While priority, deadline, or other scheduling approaches can be utilized, additional mechanisms may then be required to ensure performance isolation across classes when using a scheduling approach other than the weighted fair queuing scheduler.

Once the processes have been attached to the request service classes, the CPU scheduler handles the CPU resource allocation. The CPU scheduler on a UNIX-based system traditionally schedules all OS application processes using a time-shared priority based scheduler. The scheduling priority then depends on the CPU usage of the process, the I/O activity, and the process priority. Under the present invention, however, a hierarchical proportional-share scheduler, that dynamically partitions the CPU bandwidth among the classes, is preferably used to achieve the desired response time goal of a class and provide performance isolation. Specifically, a hierarchical start-time fair queuing (HSFQ) scheduler is used to share the CPU bandwidth among various classes of requests. HSFQ is a hierarchical CPU scheduling approach that fairly allocates processor bandwidth to different service classes and uses a class-specific scheduler for processes within a class. The scheduler uses a tree-like structure with each process (or thread) belonging to exactly one leaf node. The internal nodes implement the start-time fair queuing (SFQ) scheduler that allocates weighted fair shares, such that the bandwidth allocated to a node is in proportion to its weight. Unused bandwidth is redistributed to other nodes according to their weights. The properties of SFQ, namely that it does not require the CPU service time to be known a priori and that it can provide provable guarantees on fairness, delay and throughput received by each process (or thread), make it a desirable proportional-share scheduler for service differentiation.

In a sample embodiment, a 2-level hierarchy (consisting of the root and various service classes) is used. On accepting a web request, each web server process is dynamically attached to the corresponding service class and the CPU share of the class is determined dynamically based on the requirements of the class and the current workload.

It is to be noted that share-based CPU scheduling may not be required if the number of processes attached to a class can be adjusted dynamically, at least for small file accesses and single tiered systems. However, a direct correlation between number of processes per class and the CPU bandwidth that a class receives does not always hold for more complex systems and requests. When processes have different service time requirements, have different disk I/O idling times, or are kept alive by HTTP/1.1 for connection re-use across requests, the above-described share-based CPU embodiment is preferred. Accordingly, for more fine-grained performance control, a share-based CPU scheduler is required.

The monitoring framework continuously obtains measurements on the state of each resource and class used by the adaptation engine. These measurements can be broadly categorized into per-class, or local measurements, and resource-wide, or global measurements. Examples of local measurements include per-class delays in a resource, per-class request arrival rates, or the work required by a class's requests at a resource. Examples of global measurements include resource utilization or global queue lengths.

The monitoring subsystem is a set of kernel mechanisms to extract measurements from each of the resources managed by the adaptation framework. As an example, per-class delay measurement monitoring can be implemented for the accept queue and the CPU run queue. In the case of the accept queue, when a connection is enqueued in the accept queue, its arrival is timestamped in the associated socket data structure. When the request is dequeued from the accept queue, as dictated by the accept queue scheduler, the departure of the request is timestamped. Based on the two timestamped values, the time that the request spent in the accept queue is calculated. This measurement is aggregated in a running counter, together with the number of requests seen by the accept queue. In a similar manner, for CPU, the time spent by a process waiting in the run queue and running on the CPU can be tracked.

A system call interface is used to allow the adaptation algorithm to perform monitoring as well as resource control. An ioctl like system call, sys.multisched( ), can be added to the kernel for this purpose. The sys.multisched( ) call takes as arguments a command and some command-specific arguments. The commands allow the local class-specific values and global resource values to be queried or updated. For local class-specific measurements, the call arguments identify the command, the resource, the resource-specific metric of interest, and the class identifier. For global measurements, the call arguments only identify the resource and the metric of interest.

Operationally, two timers are used, namely a monitoring timer and an adaptation timer. The values are measured by the monitor every monitoring instant, or "tick" where the time interval per tick, Tm, is a configurable value. The time interval between the adaptation instants, Ta=kTm, indicates that an adaptation instant happens after multiple monitoring instants, or every k ticks. The measured values of over the k ticks are averaged to give the current value at the start of a new adaptation instant. The value at the previous adaptation instant is exponentially averaged using a weighting factor $\alpha$. For a resource parameter a, whose exponentially averaged value in the past cycle was $a_{prev}$, and the new set of values at the start of the current adaptation instant were $a_1, a_2, \ldots a_k$, the new value, $a_{cur}$ is given by:

$$a_{cur} = \alpha \cdot a_{prev} + (1-\alpha) \cdot \frac{\sum_{i=1}^{k} a_i}{k}; \quad (0 \leq \alpha \leq 1).$$

The adaptation engine builds upon the monitoring and the scheduling and control infrastructure described above. Based on the measured values returned by the monitoring agent, the adaptation algorithm computes and sets new shares and weights in the schedulers in order to meet the QoS goals of each class.

Figure 3:
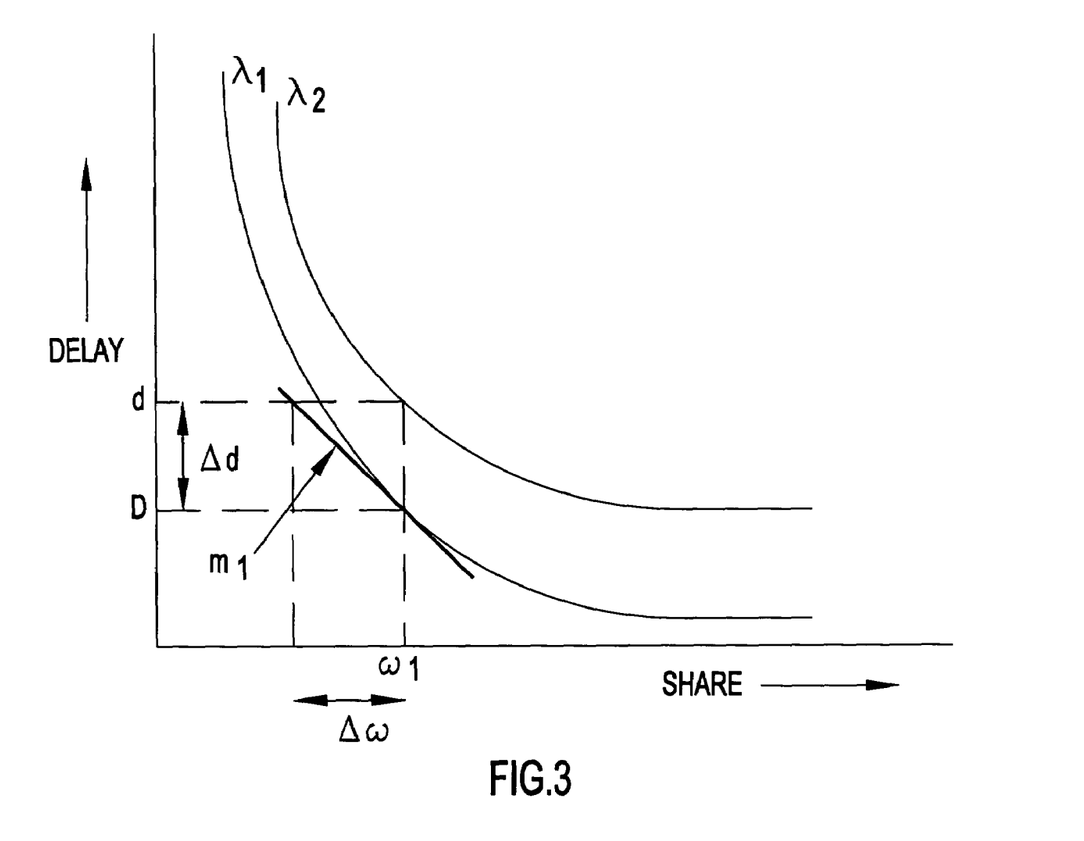
FIG. 3 illustrates the delay:share relation for different request arrival rates in a system as illustrated for the present invention.

The adaptation engine uses an observation-based approach to adjust the resource allocations for each class based on the monitored performance and the desired QoS goal. The adaptation progresses on two levels, specifically, the local, per-resource, level and a global level, across resources. An observation-based approach for adaptation is most suited for handling varying workloads and non-linear behaviors. FIG. 3 depicts how delay may vary with share assigned to a class, where the share for a class translates to its resource utilization. FIG. 3 illustrates that (i) the delay-share relationship may change with the request arrival rate c, as depicted by the two c curves; and (ii) the delay-share relationship is non-linear even when the request rate remains the same. Accordingly, a basic idea in the present observation-based approach is to approximate the non-linear relationship between the delay of a class and its share (or weight) by multiple piecewise linear parts. The algorithm continuously keeps track of the current operating point of each class on its delay-share curve. The observation-based approach depends on run-time adaptation, and hence is well-suited for highly variable and dynamic workloads. As noted above, the observation-based adaptation proceeds on two levels, specifically, a local per-resource adaptation and a global system-wide adaptation, as described in detail hereinafter.

The local adaptation algorithm of each resource needs to ensure that each class achieves its QoS (in this case response time) goal for that resource. For each class i, let $D_i$ represent its desired response time, and $d_i$ be its observed average delay in that resource. Furthermore, for each class i, the algorithm maintains an estimate of the slope, $m_i$, of its delay-share (or delay-weight) curve at the current operating point. The adaptation algorithm tries to adapt the share of each class, $w_i$, such that the delay value $d_i$ lies in the range:

$$[(1-\epsilon)D_i, (1+\epsilon)D_i].$$

The adaptation proceeds in the following four steps:

Determining class state: At every adaptation instant, the local adaptation engine computes the current value of $d_i$ from the monitored values, as described above. At every adaptation instant, the algorithm checks whether each class is missing its local response time goal by comparing the values of $d_i$ and $D_i$. A class that is missing its goal (i.e., $d_i \geq (1+\epsilon)D_i$) is called an underweight class. Similarly, a class that is more than meeting its goal (i.e., $d_i \leq (1-\epsilon)D_i$) is called an overweight class. Other classes that have their delay within the range of the desired delay are called balanced classes. The underweight classes are ordered to determine the most underweight class. The algorithm tries to borrow shares from the overweight classes such that the most underweight class becomes balanced. This redistribution step, however, must ensure that the overweight classes are not overly compensated to make them underweight as a result.

Redistribution: For redistributing the share across classes, the algorithm needs to quantify the effect of changing the share allocation of a class on its delay. This is computed by using the slope estimate $m_i$ at the current operating point on the delay-share curve. The total extra share needed by an underweight class i, as shown in FIG. 3, is given by:

$$\Delta w_i = \frac{(d_i - D_i)}{m_i}.$$

The extra share required by the underweight class is not equally distributed among the overweight classes. Instead, the amount of share that an overweight class can donate is based on its sensitivity to a change in share. There are two factors that affect the sensitivity of an overweight class j, (i) its delay slack given by$(D_j-d_j)$, which measures how much better off it is from its desired delay goal, and (ii) the current slope of its delay-share curve $m_j$, which measures how fast the delay changes with a change in share. Based on these factors, the surplus $s_j$ for an overweight class j is given by:

$$s_j = \frac{(D_j - d_j)}{m_j}.$$

The surplus of each overweight class is proportionally donated to reduce the likelihood of an overweight class becoming underweight. The donation, donation$_j$, of an overweight class is a fraction of the required extra share weighted by its surplus, and is given by:

$$donation_j = \Delta w_i \cdot \left( \frac{s_j}{\sum_k s_k} \right).$$

Before committing these donations, it must be checked that the new delay value does not make the overweight class miss its delay goal. Based on the slope $m_j$, it can be predicted that the new delay value of the overweight class would be given by:

$$d'_j = d_j + m_j \cdot donation_j.$$

If the new delay value misses the delay goal, i.e., if $d'_j \geq (1+\epsilon)D_j$, the donation is clamped down to ensure that new delay is within the range of the desired delay. The clamped donation is given by:

$$clamped\_donation_j = \frac{[(1-\epsilon) \cdot D_j - d_j]}{m_j}.$$

The actual donation of an overweight class is, therefore:

Actual_donation$_j$=min{donation$_j$−clamped_donation$_j$}.

The total donation available to the underweight class i, which is the sum of the actual donations of all the overweight classes, i.e., $\Sigma_j$actual_donation$_j$, is never greater than the required extra share $\Delta w_i$.

One underlying principle of the redistribution step is that the overweight classes are never penalized more than required. This is necessary because the slope measurements are accurate only in a localized operating region and could result in a large, but incorrect, surplus estimate. When workloads are changing gradually, it is most likely that the extra share requirements of an underweight class will be small, thereby, making the proportional donation of the overweight classes smaller.

Gradual adjustment: Before committing the actual donations to the overweight and underweight classes, the algorithm relies on gradual adjustment to maintain stability. This is another mechanism to ensure that there are no large donations by the overweight classes. A large donation could change the operating region of the classes which would make the computations based on the current slope value incorrect. Hence, gradual adjustment is performed by only committing a fraction $\beta(0 \leq \beta \leq 1)$, of the computed actual donation, which is given by:

commit_donation$_j$=β·actual_donation$_j$.

The algorithm commits the new shares (or weights) to all the involved classes by using the resource control hooks described above.

Settling: After committing the donations, the adaptation algorithm delays the next adaptation instant, by scaling the adaptation timer, to allow the effect of the changes to settle before making further adaptation decisions. The adaptation cycle is kept short during stable states to increase responsiveness and the cycle is only increased when settling is required after a change to increase stability. The committed donations change the current operating points of the involved classes along their delay-share curves. At the next adaptation instant, the algorithm measures the actual observed change in the per-class delays, and uses these values to obtain updated values of the slope $m_i$ for each class. The updated mi values are used in the above adaptation equations whenever adaptation is performed next.

The system-wide global adaptation algorithm maps the overall response time goals for each class to local response time goals for each resource used by that class. One approach is to use the same value for both the system-wide response time goal and the local goal per resource. Although this is a straightforward choice for initial values, it can reduce performance when different classes have a different bottleneck resource. The main idea behind the utilization-based heuristic for determining local goals is to give a class a more relaxed goal in its bottleneck resource, i.e., the resource where the class requirements are high relative to the resource capacity. To determine the per-class resource utilizations, the global adaptation engine, at every adaptation instant, uses the monitored values of the work required, $C_{i,j}$, by each class i using resource j, and the total capacity $C_j$ of each resource j. While the capacity may be a fixed constant (e.g., MIPS) in the case of CPU, for the accept queue it is the measured process regeneration rate of the web server, i.e., the rate at which connections are accepted from the accept queue.

Let $D_i$ be the global response time goal of class i, and $D_{i,j}$ be the local response time goal of class i in resource j. The sum of the local response time goals should equal the system-wide goal. The local value depends on the utilization $u_{i,j}$, for the class i in resource j, which is given by:

$$u_{i,j} = \frac{C_{i,j}}{C_j}.$$

Using the utilization value, the global response time goal is proportionally allocated between the resources, to give the local response time goals for each class:

$$D_{i,j} = D_i \cdot \left( \frac{u_{i,j}}{\sum_k u_{i,k}} \right).$$

In the case that the global allocation algorithm determines that a feasible allocation of local deadlines is not possible to meet the response time goals, it provides a second level approach whereby it solves an optimization problem to determine what request rates to admit for each request class, such that the maximum amount of revenue will be derived from the system. Standard optimization problem solvers are used for this purpose.

Standard optimization problem solvers are used for solving the admission control problem, and can be found in standard texts in optimization theory. The mechanism to do admission control is SYN policing, which is a standard facility available in various operating systems, to limit the request rates coming into the system. The key contribution is to tie together a monitoring framework, an optimization problem solver, and an admission control mechanism to achieve adaptive, revenue-maximizing admission control for the system.

The proposed method for controlling outbound networking delays is as follows. Outbound flows use TCP (transmission control protocol) to send data. The bandwidth available to each TCP flow is determined by a standard bandwidth estimation algorithm that is part of the TCP protocol. This bandwidth determines the delay incurred by a network flow, and hence is a part of the overall delay incurred by a request that uses an outbound TCP flow to send data. When multiple flows share a bottleneck link in the network, they are entitled to a combined fair share of the network bandwidth at that bottleneck link, determined individually for each flow by TCP. Such a set of flows is called a TCP aggregate. The present method re-distributes the total bandwidth available to an aggregate among the individual flows in the aggregate, in accordance to their delay requirements. Thus, a flow requiring lower delay gets a higher share of the aggregate bandwidth compared to a flow whose delay requirements are more relaxed.

Figure 4:
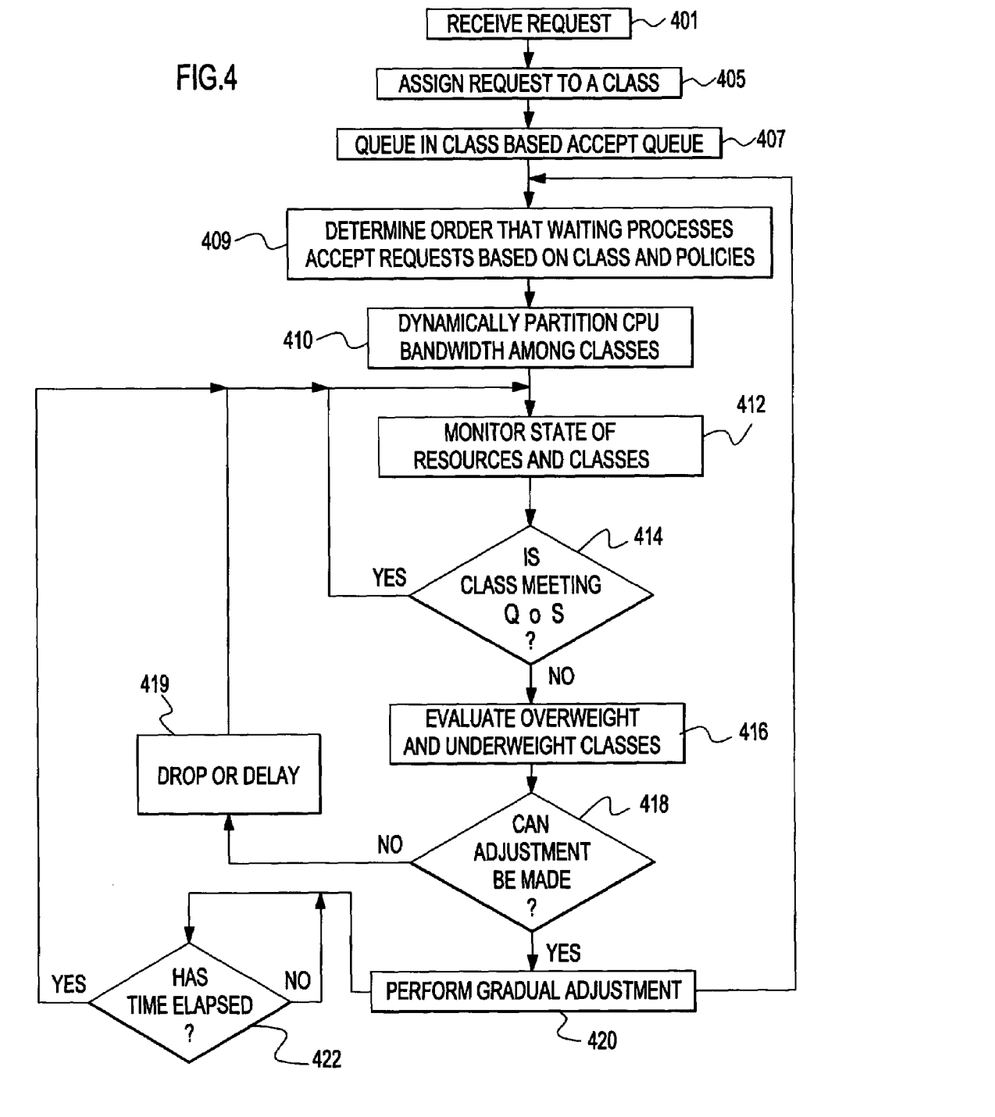
FIG. 4 illustrates a process flow for implementing the present invention.

FIG. 4 provides a representative process flow for the present invention to manage system resources in such a way as to provide service time guarantees to various classes of work using the system. Upon receipt of a request at 401, the request is assigned to a class at 405. After class assignment, the request is queued at 407 in a class-based accept queue. At 409, the accept queue scheduler determines the order in which waiting processes accept requests based on weights and policies. At 410, the CPU scheduler dynamically partitions the CPU bandwidth among the classes and schedules execution of the requests. Throughout the process, the monitor is monitoring the state of the resources and of the classes, at 412. While the process flow necessarily has an order to the steps, it is to be understood that, once the initial servicing of requests begins, the determining, partitioning, monitoring and adjusting are effectively conducted simultaneously. Based on the monitoring at 412, it is determined at 414 whether a class of request is meeting its QoS guarantees. If the guarantees are being met, the monitoring continues without any adjustments. If, however, the guarantees are not being met, as determined at 414, the adaptation engine evaluates the adjusting of class shares from overweight to underweight classes, and the impact of adjustments on the classes. At decision box 418, a determination is made as to whether an adjustment can be made. If an adjustment cannot be made, it may be necessary to delay or drop some requests at 419. However, if an adjustment can be made, gradual adjustment is undertaken at 420 by providing input to the accept queue scheduler. After a gradual adjustment, the system is permitted to "settle" as discussed above. Upon expiration of the settlement period, at 422, the monitoring and adjustment evaluation are again undertaken to determine if further adjustment is needed and/or possible.

A practical example of an implementation of the present invention is in a server system consisting of multiple tiers, including a front-end tier of web servers, a middle tier of application servers, and a back-end tier of database servers. If the system is used for serving stock trading requests, two classes of requests that may be defined for institutional investors and day traders, with each requiring different service time guarantees, of, for example, 1 second and 2 seconds respectively for their requests. The proposed method and system would allocate system resources such as CPU, disk and network capacity, to these two classes of requests in such a way that these service guarantees will be met. If the system resources are not sufficient to meet the service time guarantees, the method will limit the requests of one or both classes in such a way that the revenue from these requests will be maximized. For example, the day trader's request may provide less revenue compared to an institutional investor's request, then to maximize revenue when the resources are not sufficient, the system may admit more institutional investor's requests to generate more revenue.

The invention can be implemented in a program storage device readable by machine, the program storage device storing a program of instructions executable by the machine to perform the foregoing method for providing computer server servicing of client request for a plurality of request classes each having different response time guarantees.

Modifications can be made to the detailed embodiments without departing from the spirit and scope of the invention as set forth in the appended claims.

The invention claimed is:

1. A system for providing computer server servicing at a plurality of server resources of client requests for a plurality of request classes each having different response time guarantees comprising:
a computer processing unit (CPU) for executing a resource management component, a monitoring component, an adaptation engine, and a server resource scheduler;
the resource management component comprising a component for accepting and dynamically scheduling client requests and allocating system resources for request handling based on request classes, a predetermined scheduling policy and received adjustment input, said resource management component comprising a classifier for classifying incoming client requests into each of said plurality of request classes, a plurality of class-based accept queues for queuing said incoming client requests, and an accept queue scheduler for determining the order in which queued client requests are provided for servicing based on said classes, the predetermined policy and the adjustment input;

the monitoring component comprising a component for monitoring the handling of requests in different request classes, for monitoring resource usage and for providing request handling and resource usage feedback results to an adaptation engine;

the adaptation engine comprising an engine for evaluating the request handling and resource usage feedback results of said monitoring and for generating adjustment input to said resource management component to adjust the allocating of system resources for each class based on the evaluating of request handling and resource usage feedback results and response time guarantees; and the server resource scheduler comprising a scheduler for allocating resources to service queued client requests provided from said accept queue scheduler, wherein the server resource scheduler is a hierarchical start-time fair queuing scheduler.

2. The system of claim 1 wherein the accept queue scheduler is a weighted fair queuing scheduler.

3. The system of claim 1 wherein said monitoring component comprises at least one timer for determining the time for a queued request to be removed from its accept queue.

4. The system of claim 1 wherein said accept queue scheduler dynamically alters said order based on said adjustment input.

5. A method for providing computer server servicing at a plurality of server resources of client requests for a plurality of request classes each having different response time guarantees comprising the steps of:

accepting and dynamically scheduling client requests and allocating system resources for request handling based on request classes, a predetermined scheduling policy and received adjustment input by the steps of classifying incoming client requests into each of said plurality of request classes, queuing classified incoming client request into a plurality of class-based accept queues, and determining the order in which queued client requests are provided for servicing based on said classes, the predetermined policy and adjustment input;

monitoring the handling of requests in different request classed and server resource usage and for providing request handling and resource usage feedback results for evaluation;

evaluating the request handling and resource usage feedback results of said monitoring; and generating adjustment input for the dynamically scheduling to adjust resource allocations for each class based on said evaluating of request handling and resource usage feedback results and the response time guarantees, wherein the allocating is performed by a hierarchical start-time fair queuing scheduler.

6. The method of claim 5 wherein the determining the order is performed by a weighted fair queue scheduler.

7. The method of claim 5 wherein said monitoring comprises determining the time for a queued request to be removed from its accept queue.

8. The method of claim 5 wherein said determining the order further comprises dynamically altering said order based on said adjustment input.

9. A program storage device readable by machine storing a program of instructions executable by the machine to perform method steps for providing computer server servicing at a plurality of server resources of client requests for a plurality of request classes each having different response time guarantees, said method comprising the steps of:

accepting and dynamically scheduling client requests and allocating system resources for request handling based on request classes, a predetermined scheduling policy and received adjustment input by the steps of classifying incoming client requests into each of said plurality of request classes, queuing classified incoming client request into a plurality of class-based accept queues, and determining the order in which queued client requests are provided for servicing based on said classes, the predetermined policy and adjustment input;

monitoring the handling of requests in different request classed and server resource usage and for providing request handling and resource usage feedback results for evaluation;

evaluating the request handling and resource usage feedback results of said monitoring; and generating adjustment input for said dynamically scheduling to adjust the allocating of system resources for each class based on said evaluating of request handling and resource usage feedback results and the response time guarantees, wherein the allocating is performed by a hierarchical start-time fair queuing scheduler.

* * * * *